UNITED STATES PATENT OFFICE 2,018,801

AZO DYESTUFFS

Wilhelm Neelmeier, Leverkusen-I. G. Werk, and August Modersohn, Cologne-Mulheim, Germany, assignors to General Aniline Works, Inc., New York, N. Y., a corporation of Delaware No Drawing. Application April 7, 1933, Serial No. 665,040. In Germany April 25, 1932

4 Claims. (Cl. 260—97)

The present invention relates to azodyestuffs, more particularly it relates to dyestuffs which may be represented by the probable general formula:

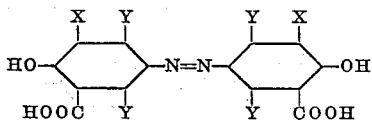

wherein one X stands for hydrogen or the sulfonic acid group and the other X stands for the sulfonic acid group, alkyl or halogen, in such a manner that at least one X represents the sulfonic acid group, and the Y's stand for hydrogen, alkyl or halogen.

Our new dyestuffs are obtainable by treating with a sulfonating agent an azodyestuff of the general formula:

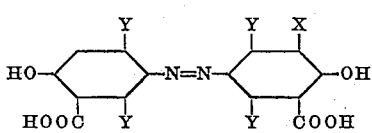

wherein X stands for hydrogen, alkyl or halogen and the Y's stand for hydrogen, alkyl or halogen, the manufacture of these dyestuffs being described for example in German Patent No. 278,613.

Instead of starting with these dyestuffs, one may use the complex chromium compounds which are described, for example, in French Patent 749,971 and which are obtainable by heating the 4-amino-1-hydroxybenzene-2-carboxylic acid or a nuclear substitution product thereof in the free form or in form of a water-soluble salt with a water-soluble chromium salt containing the chromium in the trivalent form in water or in an organic solvent and, if desired, with the addition of a non-diazotizable base.

The process is carried out in the usual manner of sulfonating organic compounds, thereby using for example sulfuric acid monohydrate or fuming sulfuric acid, and due to the working conditions, mono- or disulfonic acids are obtained, it being self-understood that on working with stronger sulfonating agents, such as for example a fuming sulfuric acid with a high $SO_3$-content, and at elevated temperatures, such as for example at 125–150°, generally disulfonic acids being produced, while moderately acting sulfonating agents and lower temperatures, such as sulfuric acid monohydrate and temperatures from about 75° C. to about 110° C., generally produce monosulfonic acids.

Our new dyestuffs are in form of their alkali metal salts generally yellowish to brown powders, soluble in water and dyeing wool from an acid bath, after chroming, generally yellowish to brownish shades of good fastness properties.

Example 1.—100 parts by weight of 4.4'-dihydroxyazobenzene-3.3'-dicarboxylic acid are introduced, while stirring, into 550 parts by weight of sulfuric acid monohydrate, care being taken that the temperature does not exceed 40° C. Stirring is continued for about 5 hours at room temperature, then 60 parts by weight of sulfuric acid containing 65% of $SO_3$ are added, and the temperature is raised to about 130 to 135° C. and kept at this temperature for about 3 hours. After cooling, the sulfonation mixture is poured onto ice, the precipitate is filtered, dissolved in water with the aid of soda, and the sodium salt of the dyestuff is salted out by the addition of common salt. The bulk of the dyestuff is the sodium salt of 4.4'-dihydroxyazobenzene-3.3'-dicarboxylic acid-5.5'-disulfonic acid having in the free state the following formula:

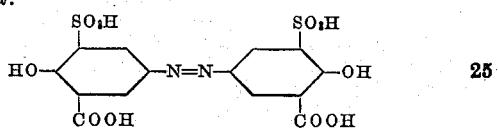

When dried, it is a yellow powder, soluble in concentrated sulfuric acid with an orange red coloration, dyeing wool, after chroming, clear greenish-yellow shades.

When using sulfuric acid monohydrate as sulfonating agent and working at a temperature of about 100° C., the bulk of the dyestuff consists of the 4.4'-dihydroxyazobenzene-3.3'-dicarboxylic acid-5-sulfonic acid of the formula:

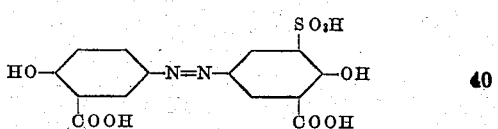

said dyestuff having similar properties.

Example 2.—25 parts by weight of the dyestuff from diazotized 4-amino-1-hydroxybenzene-2-carboxylic acid and 5-methyl-1-hydroxybenzene-2-carboxylic acid are dissolved with stirring and at room temperature in 140 parts by weight of sulfuric acid monohydrate. After the addition of 15 parts by weight of fuming sulfuric acid containing 65% of $SO_3$, the sulfonation mixture is heated for about 3 to 3½ hours at 130° to 140° C. After cooling, the mass is poured onto ice, dissolved in aqueous soda solution, and the dyestuff having in its free state the following probable formula:

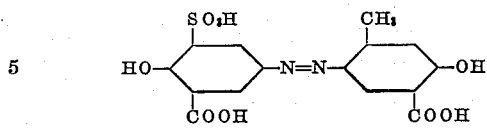

is salted out by the addition of common salt. It dyes wool, after chroming, clear yellowish-brown shades of good fastness properties.

By substituting the 5-methyl-1-hydroxybenzene-2-carboxylic acid by the 6-methyl-1-hydroxybenzene-2-carboxylic acid, there is obtained a dyestuff of the following probable formula:

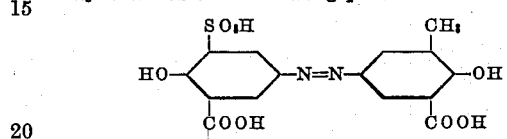

dyeing, after chroming, somewhat more greenish shades.

By substituting the 5-methyl-1-hydroxybenzene-2-carboxylic acid by the 5-chloro-1-hydroxybenzene-2-carboxylic acid, there is obtained a dyestuff of the following probable formula:

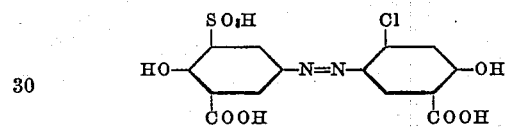

dyeing, after chroming, somewhat more reddish shades.

*Example 3.*—50 parts by weight of the chromium complex compound of the dyestuff from 4-amino-1-hydroxybenzene-2-carboxylic acid and salicylic acid are introduced, while stirring, into 175 parts by weight of sulfuric acid monohydrate. After heating for 3 hours at a temperature of 130° to 135° C., the mass is poured onto ice, after cooling. The precipitate is filtered, washed with a solution of common salt, until free from chromium, then it is dissolved in aqueous soda solution, and the sodium salt of the dyestuff is salted out by the addition of common salt. The dyestuff is a mixture of 4.4′-dihydroxyazobenzene-3.3′-dicarboxylic acid-5-mono- and -5.5′-disulfonic acid, the bulk being disulfonic acid.

The starting dyestuff is obtainable according to the directions given in Example 5 of French Patent No. 749,971 by refluxing for several hours 4-amino-1-hydroxybenzene-2-carboxylic acid in aqueous pyridine of about 33% of volume and with the addition of aqueous chromium chloride solution, filtering the crystalline chromium-pyridine-4-amino-1-hydroxybenzene-2-carboxylic acid, covering the same with a mixture (3.75:1) of glacial acetic acid and hydrochloric acid of 22° Bé., diazotizing by adding the calculated quantity of aqueous sodium nitrite solution of 10% and introducing the diazo solution into an aqueous caustic soda alkaline solution prepared in the usual manner from the calculated quantity of salicylic acid, care being taken that during the coupling ice is present and that the solution reacts caustic alkaline.

We claim:

1. Azodyestuffs of the general formula:

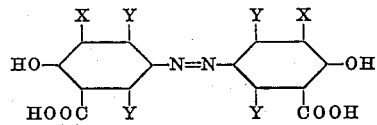

wherein one X stands for hydrogen or the sulfonic acid group and the other X stands for the sulfonic acid group, alkyl or halogen, in such a manner that at least one X represents the sulfonic acid group, and the Y's stand for hydrogen, alkyl or halogen, being in form of their alkali metal salts generally yellowish to brownish powders, soluble in water, and dyeing wool from an acid bath, after chroming, generally yellowish to brownish shades of good fastness properties.

2. Azodyestuffs of the general formula:

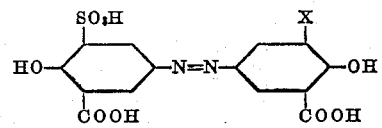

wherein X stands for hydrogen, the sulfonic acid group, alkyl or halogen, being in the form of their alkali metal salts generally yellowish to brownish powders, soluble in water, and dyeing wool from an acid bath, after chroming, generally yellowish to brownish shades of good fastness properties.

3. The azodyestuff of the following formula:

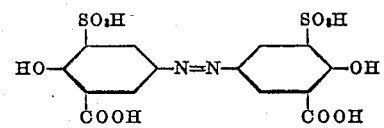

being in form of its alkali metal salts a yellow powder, soluble in concentrated sulfuric acid with an orange red coloration, and dyeing wool, after chroming, clear greenish-yellow shades of good fastness properties.

4. The azodyestuff of the following formula:

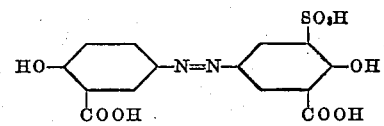

being in form of its alkali metal salts a yellow powder, soluble in concentrated sulfuric acid with an orange red coloration, and dyeing wool, after chroming, clear greenish-yellow shades of good fastness properties.

WILHELM NEELMEIER.
AUGUST MODERSOHN.